United States Patent
Christiansen et al.

(10) Patent No.: US 8,941,253 B2
(45) Date of Patent: Jan. 27, 2015

(54) METHOD FOR OPERATING A WIND TURBINE HAVING A ROTOR HUB SUPPORTING AT LEAST ONE ROTOR BLADE

(71) Applicants: Per Moelhave Christiansen, Ikast (DK); Thomas Esbensen, Herning (DK); Hans Laurberg, Århus C (DK); Johnny Rieper, Horsens (DK)

(72) Inventors: Per Moelhave Christiansen, Ikast (DK); Thomas Esbensen, Herning (DK); Hans Laurberg, Århus C (DK); Johnny Rieper, Horsens (DK)

(73) Assignee: Siemens Aktiengesellschaft, Munich (DE)

( * ) Notice: Subject to any disclaimer, the term of this patent is extended or adjusted under 35 U.S.C. 154(b) by 71 days.

(21) Appl. No.: 13/762,492

(22) Filed: Feb. 8, 2013

(65) Prior Publication Data
US 2013/0264823 A1    Oct. 10, 2013

(30) Foreign Application Priority Data
Apr. 4, 2012   (EP) ..................................... 12163152

(51) Int. Cl.
*F03D 7/04*   (2006.01)
*F03D 11/00*  (2006.01)
*F03D 7/02*   (2006.01)

(52) U.S. Cl.
CPC   *F03D 7/04* (2013.01); *F03D 7/046* (2013.01); *F03D 11/0025* (2013.01); *F03D 7/02* (2013.01); *Y02E 10/722* (2013.01); *Y02E 10/723* (2013.01)
USPC ............................................ 290/44; 700/287

(58) Field of Classification Search
CPC .. Y02E 10/723; F03D 7/048; F05B 2270/707
USPC ............................................ 290/44; 700/287
See application file for complete search history.

(56) References Cited

U.S. PATENT DOCUMENTS

| | | | |
|---|---|---|---|
| 5,481,648 A * | 1/1996 | Volponi et al. | 706/45 |
| 5,652,485 A * | 7/1997 | Spiegel et al. | 318/147 |
| 5,806,052 A * | 9/1998 | Bonissone et al. | 706/4 |
| 5,914,537 A * | 6/1999 | Zaviska et al. | 290/52 |
| 2011/0004356 A1 * | 1/2011 | Garcia | 700/287 |
| 2011/0081226 A1 | 4/2011 | Wobben | |
| 2011/0241343 A1 | 10/2011 | Petter | |
| 2012/0076651 A1 | 3/2012 | Laurberg | |

FOREIGN PATENT DOCUMENTS

| | | |
|---|---|---|
| DE | 102010015595 A1 | 10/2011 |
| EP | 1179463 B1 | 10/2007 |
| WO | WO 2011127990 A2 | 10/2011 |

* cited by examiner

*Primary Examiner* — Michael Zarroli (57) ABSTRACT

A method for operating a wind turbine which includes a rotor hub supporting a rotor blade includes: a) detecting changes in the aerodynamic performance of the rotor blade; b) determining a first control rule; c) determining a first power output information indicating a first power output based on the first control rule; d) changing an operational parameter and choosing a second control rule such that the first control rule is replaced by the second control rule; e) determining a second power output information indicating a second power output based on the second control rule. c) comparing the first and second power output information. If the second power output exceeds the first power output, repeating a)-f) with the second control rule being used as the first control rule in b); otherwise repeating a)-f) a different second control rule is applied in d).

11 Claims, 3 Drawing Sheets

METHOD FOR OPERATING A WIND TURBINE HAVING A ROTOR HUB SUPPORTING AT LEAST ONE ROTOR BLADE

CROSS REFERENCE TO RELATED APPLICATIONS

This application claims priority of European Patent Office application No. 12163152.7.3 EP filed Apr. 4, 2012. All of the applications are incorporated by reference herein in their entirety.

FIELD OF INVENTION

The disclosure relates to a method for operating a wind turbine having a rotor hub supporting at least one rotor blade.

BACKGROUND OF INVENTION

It is known that changes of the aerodynamic performance or properties of the rotor blades of a wind turbine may both impact the performance of the rotor hub and change the optimal control rule usually embracing a number of control settings, operational parameters, etc., and may consequently lead to a decrease of the power production of the wind turbine. Thus, a wind turbine will operate suboptimal and a specific rated power production may not be reached in this case.

The aerodynamic performance of the rotor blades is mainly negatively influenced due to specific climatic conditions such as temperature, humidity etc. which may lead to the formation of ice at least partially covering the surface of the rotor blades. This problem usually occurs during winter.

Thereby, it is a problem that rotor blades being at least partially covered with ice usually tend to stall due to the weight and shape of the ice and/or because the currently control rule typically assuming blades free of ice is no longer appropriate or suitable, which usually leads to a significant decrease of the power output of the wind turbine. Further, icy or frosted rotor blades may also encounter high mechanical loads as well as thrust.

Usually, operation and/or control rules or strategies of modern wind turbines are based on the adjustment of proper pitch-angle references, power output references and/or torque references, etc. which adjustment relates to a known aerodynamic performance of the rotor blades which is essentially defined by their shape, dimensions, etc. Thereby, usually respective power values defining a certain amount of power which the generator has to submit to at least one electrical converter unit of the wind turbine are dynamically set by or included in a respective control rule.

However, in the case of the rotor blades being at least partially covered with ice and hence differ in their aerodynamic performance, proper operation and/or control rules or strategies of wind turbines are usually not available.

SUMMARY OF INVENTION

An improved method for operating a wind turbine assuring proper operation of the wind turbine even when the aerodynamic performance of the rotor blades is negatively influenced, particularly due to ice at least partially covering at least one rotor blade is provided.

The method for operating a wind turbine having a rotor hub supporting at least one rotor blade, the method comprising the steps of:

a) detecting changes in the aerodynamic performance of the at least one rotor blade of the wind turbine, b) determining a first control rule of the wind turbine being related to power output of the wind turbine, c) determining a first power output information indicating a first power output of the wind turbine based on the first control rule, d) changing at least one operational parameter of the wind turbine in such a manner that the first control rule is replaced by a second control rule being related to power output of the wind turbine, e) determining a second power output information indicating a second power output of the wind turbine based on the second control rule, f) comparing the first and second power output information, g1) if the second power output of the wind turbine exceeds the first power output of the wind turbine, repeating a)-f) with the second control rule being used as the first control rule;

g2) otherwise repeating a)-f), whereby a different second control rule is applied in d).

The inventive method begins with the detection of changes in the aerodynamic performance of the at least one rotor blade of the wind turbine (cf. step a)). Thereby, the detection of the aerodynamic properties of at least one rotor blade of the wind turbine may comprises detecting, if ice is at least partially covering the surface of at least one rotor blade. Therefore, appropriate ice detection means are used, whereby methods as disclosed in documents publication no. WO 2011/127990, application no. PCT/EP 2010/058333, filed by the applicant at the WIPO, filing date 15 May 2010 and EP 1 0179 463, filed by the applicant at the EPO, filing date 24 Sep. 2010 (not published yet), which are disclosed herein by reference, may be used.

In step b), a first control rule of the wind turbine being related to power output of the wind turbine is determined and usually applied. The first control rule may be based on a number of control parameters including or influencing a number of operational parameters of the wind turbine which separately, group-wise, or collectively are related to a certain power output of the wind turbine.

Particularly, the first control rule includes a respective first working point or a number of working points, which may be applied under consideration of a number of operational parameters of the wind turbine such as power output, wind speed, etc. The working points are usually based on a respective first speed-power-curve or speed-torque-curve. The working points usually relate to respective power values, i.e. they represent or relate to a respective amount of power the generator has to supply to respective electrical converter units of the wind turbine. The electrical converter units are known and essentially serve as a connection between the generator of the wind turbine and a grid. Hence, a respective electrical converter unit may comprise a number of inverters, rectifiers, etc.

Hence, a first control rule may be applied. The first control rule may involve a first working point which is set to a power value of approx. 1000 kW, i.e. appropriate control parameters are generated and a proper adjustment of all relevant operational parameters of the wind turbine is performed so that the generator will supply approx. 1000 kW to the respective electrical converter units of the wind turbine. In other words, operation of the wind turbine may be executed in such a manner that a power output of approx. 1000 kW may be obtained under normal circumstances, i.e. under respective circumstances in which the aerodynamic performance of none of the rotor blades is not negatively influenced by ice or the like.

The first control rule of the wind turbine may be the control rule which is usually applied under normal circumstances, i.e. when the aerodynamic performance of the rotor blade is not negatively influenced by ice or the like.

The first control rule considers diverse internal or external operational parameters of the wind turbine such as power output, wind speed, etc. and may apply or adapt at least one working point of the wind turbine as a part of the control rule. Hence, the respective working point may be continuously adapted under consideration of current climatic conditions such as particularly wind speed, for instance. Hence, a respective control rule may adapt the working point when wind speed increases in that generator speed and output power may be accordingly increased, for instance.

In a subsequent step c) a first power output information indicating a first power output of the wind turbine based on the first control rule is determined. Hence, the effective power output of the wind turbine is determined during operation of the wind turbine on basis of the first control rule.

Before the first power output information is determined, a certain time interval, which may be denoted as settling time, may be waited after determining or applying the first control rule. The time interval may be 30 seconds, for instance, i.e. the effective power output of the wind turbine in the shape of the first power output information is determined 30 seconds after determining and/or applying the first control rule.

In step d) at least one operational parameter of the wind turbine is changed and at least one second control rule is chosen in such a manner that the first control rule is replaced by the second control rule being related to power output of the wind turbine. Hence, operation of the wind turbine will no longer be based on the first control rule, but on the second control rule. The second control rule will usually relate to lower power values compared with the power values of the first control rule. I.e. the amount of power the generator supplies to the electrical converter units based on the second control rule is usually lowered to a certain degree in comparison to the amount of power the generator supplies to the electrical converter units based on the first control rule, for a given rotational speed.

Generally, the respective power values related to the second control rule are scaled in comparison to the respective power values related to the first control rule. Scaling or offsetting is generally possible in negative or positive direction, so that the respective power values related to the second control rule may generally be lower or higher in comparison to the respective power values related to the first control rule. Scaling may be executed in such a manner that each respective power value of the first control rule is concertedly changed by a given degree, i.e. either lowered or raised by means of at least one scaling factor.

However, when applying the method for the first time, i.e. in a first loop of the inventive method, the respective power values related to the second control rule will usually be lower in comparison to the power values related to the first control rule.

Thus, the second control rule may involve power values which are, particularly collectively, scaled down by 10%, for instance. Hence, a respective second working point of the second control rule may refer to power values which are 10% lower in comparison to respective power values based on working points of the first control rule. Thereby, appropriate control parameters are generated and a proper adjustment of all relevant operational parameters of the wind turbine is performed so that operation of the wind turbine may be executed on basis of the second control rule.

As has been mentioned, the second control rule may be obtained by adjusting, i.e. particularly scaling or offsetting the first control rule with an appropriate step-size, i.e. the respective power values of the first control rule may be scaled by a certain scaling value or scaling factor. Hence, when applying a scaling of each of the respective power values of the first control by 10%, for instance, respective power values related to the second control rule or second working point as a parameter of the second control rule may be 90% of the respective power values related to the first control rule or first working point as a parameter of the first control rule, for instance.

Analogous to the first control rule, the second control rule may also be based on a number of control parameters including or influencing a number of operational parameters of the wind turbine which separately, group-wise, or collectively are related to certain power values or a certain power output of the wind turbine. A respective control parameter may be at least one working point on a respective speed-power-curve or speed-torque-curve, for instance.

When considering respective speed-power-curves, which may represent or serve as characteristic curves for the operation of wind turbines and may illustrate power output of the wind turbine or generator torque in dependency of the generator speed or rotational speed of the rotor hub, for instance, both scaling of the speed-power-curves and/or re-shaping the speed-power-curves may be possible during step d), i.e. during changing at least one operational parameter of the wind turbine in such a manner that the first control rule is replaced by a second control rule being related to different, i.e. lower power values. The same applies to speed-torque-curves, whereby a torque reference is used instead of a power reference. This is in accordance with the aforementioned scaling of respective power values of the first control rule so as to obtain the second control rule comprising scaled, i.e. different power values in comparison to the ones of the first control rule.

In the following step e) a second power output information indicating a second power output of the wind turbine based on the second control rule is determined. Hence, the effective power output of the wind turbine is determined during operation of the wind turbine on basis of the second control rule.

Again, before the second power output information is determined, a certain time interval, which may be denoted as settling time, may be waited after determining or applying the second working point. The time interval may be 30 seconds for instance, i.e. the effective power output of the wind turbine is determined 30 seconds after determining and/or applying the second control rule.

The first and second power output information are compared in step f). Thereby, particularly the effective power outputs of the wind turbine based on the first and second control rules are compared by means of an appropriate algorithm. For comparison, it may be useful to at least temporarily store the respective power outputs of the wind turbine based on the first and second control rules as well as the respective operational parameters included or applied by the respective first and second control rules in an appropriate storage medium.

If the comparison result obtained in f) indicates that the effective second power output of the wind turbine exceeds the effective first power output of the wind turbine, steps a)-f) are repeated with the second control rule being used as the first control rule in step b) (cf. step g1)).

Hence, a recurrent loop is generated, whereby the respective second control rule determined or chosen in the first loop of applying of step d) serves as a first control rule in step b) of the following loop as far as the comparison result obtained in step f) indicates that the effective power output of the wind turbine based on the respective second control rule exceeds the effective power output of the wind turbine based on the respective first control rule.

Otherwise, steps a)-f) are repeated, whereby a different, i.e. different in comparison to the first control rule, second control rule is determined and applied in d) (cf. step g2)). Thereby, a larger or smaller step size for changing and/or choosing a respective second working point of the respective control rule will be applied in comparison to the previous loop of the method. Particularly, scaling of the respective power values of the respective first control rule is executed with a different scaling factor so that the respective power values of the respective second control rule differ from the ones as previously obtained.

According to the aforementioned example, an alternative second control rule including alternative power values in comparison to the power values related to the preceding second control rule may be chosen and applied. This is essentially executed by using a different scaling factor. Hence, instead of a second control rule including power values which are scaled by 10% in comparison to the power values defined in the first control rule, respective power values of the second control may be scaled only by 5%, i.e. they are only 5% lower in comparison to the power values defined in the first control rule.

Hence, scaling down of the first working points of the first control rule, which is still the originally applied first control rule in this case, will be executed with a different, i.e. smaller step size. Thus, the power values related to the second control rule may be 95% of the respective power values defined in the first control rule, for instance.

Of course, generally scaling of the first working points of the first control rule, which is still the originally applied first control rule in this case, may also be executed with a different, i.e. larger step size. Thus, in this case the power values related to the second control rule may be 85% of the respective power values defined in the first control rule, for instance.

All in all, the inventive method may be understood as a recurrent loop aiming at an optimised operation of the wind turbine, particularly in regard of its power output, under the premise that at least one rotor blade of the wind turbine being at least partially covered with ice.

Thereby, the inventive principle is based on the notion to adaptively adjust the speed-power-curve or speed-torque-curve or speed-power-relation or speed-torque-relation of the wind turbine. This may be done by scaling, i.e. lowering or raising the respective power values defined in the respective currently applied first control rule, i.e. by changing the control rule. By concertedly reducing the power values by scaling them down with a certain scaling factor, less power has to be supplied to the respective electrical converter units, i.e. the generator of the wind turbine will require less torque resulting in—under the premise of a constant wind speed—an increase of the rotational speed of the rotor hub since a certain fraction of rotational speed and/or torque, respectively is not used required for operating the generator. As a consequence, the rotational speed of the wind turbine may increase after a certain time, which may lead to an increase of the effective power output of the wind turbine.

Having compared the respective effective power outputs obtained on basis of the first and second control rules, an adaptive and iterative adjustment of the respective currently applied control rules of the wind turbine is feasible aiming at an optimised power production in the case of rotor blades with an at least quantitatively unknown aerodynamic performance, particularly caused by ice at least partially covering at least one rotor blade.

Thereby, it is possible to compare a number of respective control rules and respective power outputs obtained or obtainable by applying the respective control rules before in fact applying a respective second control rule for further operation of the wind turbine, whereby the further operation of the wind turbine is based on the respective control rule leading to the most effective power output of the wind turbine. Thereby, the application of averaging methods, particularly concerning the average power output obtained or obtainable by applying respective second control rules, may be of advantage.

Generally, a respective change of a control rule may be due to different climatic conditions such as changing wind speed, air density, etc. Thereby, it is possible that the power output of the wind turbine may increase due to an increase in wind speed and/or a newly applied control rule. Accordingly, the power output of the wind turbine may also decrease due to a decrease in wind speed and/or a newly applied control rule.

Regarding normal operation of the wind turbine, i.e. when the rotor blades are free of ice, in the case of increasing wind speed the working point of a given control rule will change giving rise to an increased power output of the wind turbine. A respective control rule may provide a respective increase of the rotational speed of the rotor hub. Thus, the rotational speed of the rotor hub may be set to increase from 3 rpm (rounds per minute), to 4.2 rpm, and further to 5 rpm, for instance. In this exemplary case, the respective control rule provides a change in the respective power value which is related to the theoretically obtainable power output of the wind turbine. Thereby, a respective power value related to at least one electrical converter unit of the wind turbine may follow $P=K*(RS)^3$, with PR=power value related to the respective electrical converter unit, K=constant factor, and RS=rotational speed of the rotor hub. Thereby, the applied control rule does not necessarily change.

When ice is detected on at least one of the rotor blades, by applying a new control rule a respective power value related to at least one electrical converter unit of the wind turbine may follow $P=C*K*(RS)^3$, with P=power value related to the respective electrical converter unit, C=scaling factor which may be set to 0.7, for instance, K=constant factor, and RS=rotational speed of the rotor hub. In such a manner, the power required or demanded by the respective electrical converter unit is less in comparison to the power value as applied under normal circumstances, when the first control rule is applied, i.e. when no ice is detected on the rotor blades leading to an increase of the rotational speed of the rotor hub. Hence, either the rotational speed increases for the same power output of the wind turbine or the power output decreases for the same rotational speed of the rotor hub, respectively.

Thereby, an adjustment of the control rule may not refer to the adjustment of pitch-angles of the rotor blades, but to all other kinds of control and/or operational parameters relating to the power output of the wind turbine, particularly including the aforementioned power values sent to at least one electrical converter unit of the wind turbine.

The inventive method may be executed by a central wind turbine controller communicating with respective control units allocated to respective components of the wind turbine such as a control unit of the generator of the wind turbine, for instance. The central wind turbine controller may comprise appropriate algorithms to execute the method.

The second control rule may be chosen under the premise that an increase of rotational speed of the rotor hub is obtained. In other words, the second control rule may be chosen in such a manner that the power values, i.e. the power demand of the generator of the wind turbine are reduced, i.e. the generator will require less power at a given rotational speed and/or wind speed. Hence, the tendency of stalling of the frosted rotor blades may be reduced or even overcome.

Generally, choosing of the second control rule may be executed in such a manner that the power values based on the second control rule are higher or lower in comparison to the power values based on the first control rule. As mentioned above, choosing and applying the second control rule may be executed with the aim at an optimisation of the power output of the wind turbine which is executed by applying at least one second control rule including different power values in comparison to the respective currently applied first control rule. Initially the power values of the second control rule may be lower in comparison to the power values of the first control rule. Yet, during optimisation of the power output of the wind turbine, respective power values of a respective second control rule may also be higher in comparison to respective power values of a respective first control rule.

Particularly, choosing of the second control rule is executed in such a manner that power values indicating a degree of the amount of power as provided by the generator to at least one electrical converter unit of the wind turbine based on the second control rule are higher or lower in comparison to respective power values based on the first control rule. The specific choice of respective power values of a respective second control rule may vary, so that changes of the respective power values of a respective first control rule are generally possible in either positive or negative direction, i.e. respective power values of a respective second control rule may generally be higher or lower in comparison to respective power values of the previously applied first control rule.

Choosing of the second control rule may be executed in such a manner that the rotational speed of the rotor hub based on the second control rule is or will become higher in comparison to the rotational speed of the rotor hub based on the first control rule. This may be particularly achieved by choosing a respective second control rule including respective power values which are scaled by a certain scaling factor in comparison to the respective power values of a respective first control rule. If scaling, i.e. particularly scaling factor and scaling direction, was appropriate in terms of an optimisation of the power output of the wind turbine may be checked when comparing the respective effective power outputs of the wind turbine as obtained when operated on basis of the first and second control rule. In such a manner, an estimation if the scaling direction and step-size is appropriate for optimising power output.

As has been mentioned, respective power values defined in respective speed-power-curves, speed-torque-curves, etc. underlying respective second control rules may be lower in comparison to respective power output values defined in respective speed-power-curves underlying respective first control rules. In such a manner, the operation of the generator on basis of a respective second control rule will require less torque for a given rotational speed such that the rotational speed of the rotor hub will increase since the wind turbine has to deliver less power for the same rotational speed of the rotor hub than before, i.e. when assuming constant wind speed and operating the wind turbine on basis of the first control rule. In such a manner, it is possible that the effective power output of the wind turbine on basis of the second control rule may be equal or even exceed the power output of the wind turbine on basis of the first control rule which is mainly based on the fact that the rotational speed of the rotor hub based on the second control rule is higher in comparison to the rotational speed of the rotor hub based on the first control rule.

As has also been mentioned before, it may be desired that a predetermined time is waited after step d) before the second power output information is determined in step e). The time interval may be denoted as settling time and assures that the operation of the wind turbine is entirely adapted to the change of the control rule of the wind turbine, so that the wind turbine is steadily operated on basis of the respective second control rule. Basically, the same applies to the application of a first control rule, particularly when a second control rule of a previous loop of the inventive method has become the first control rule of the current loop of the inventive method (cf. step g1)).

It is possible that the frequency of determining and choosing a respective second control rule is dependent from at least one climatic parameter, particularly ambient temperature and/or ambient pressure and/or ambient humidity, indicating the climatic conditions in the region of the wind turbine. In such a manner, the frequency of changing respective control rules of the wind turbine, i.e. the time between changing the control rules of the wind turbine, may vary in dependency of diverse climatic parameters indicating the climatic conditions in the region of the wind turbine. Particularly, ambient temperature and/or ambient pressure and/or ambient humidity may be considered for choosing the number of changes of the application of a respective second control rule per time unit. Appropriate climatic sensor means provided with the wind turbine may be used for obtaining respective climatic information. Additionally and/or alternatively, respective climatic information may be transferred to the wind turbine by an appropriate communication means such as a communication network or the like.

Hence, at temperatures far below 0° C., it may be necessary to change the control rule of the wind turbine more frequently in order to obtain an optimised operation of the wind turbine correlated to an optimised power output of the wind turbine since the formation as well as the amount of ice on the rotor blades is usually increased at temperatures far below 0° C. in comparison to temperatures ranging in the region of 0° C. Hence, the ambient temperature may be used as an indicator of how often and/or how fast choosing and applying a second control rule may be executed in order to assure an optimal power output of the wind turbine.

As mentioned above, the control or operational parameters allocated to a respective control rule generally may embrace a number of operational parameters of the wind turbine. Thereby, operational parameters may relate to torque on a main shaft and/or a generator of the wind turbine, rotational speed of a rotor hub and/or rotating components of a generator of the wind turbine and/or load information concerning at least one component of the wind turbine. Further operational parameters directly or indirectly relating or influencing the power output of the wind turbine may be applicable as well.

According to a further embodiment of the inventive method, choosing of the second control rule is executed by using an adaptive step-size. Adaptive step size means that choosing of a respective second control rule or particularly at least one respective working point or power value correlated to a second control rule may be executed iteratively. Hence, since the inventive method may be executed as a recurrent loop, the step-size of changing a respective first control rule or a respective first working point or power value as parameters of the first control rule of the wind turbine to a respective second control rule or a respective second working point or power value as parameters of the second control rule may be decreased with the number of loops performed.

In such a manner, in a first loop a first control rule may refer to $P2=C*P1$, whereby P2 refers to a respective power value of the wind turbine based on the second control rule, whereas P1 relates to a respective power value of the wind turbine based on the first control rule. As has been mentioned above, respective power values P1 and P2 are correlated to a respective power output of the wind turbine. Both P1 and P2 may be a function of different operational parameters of the wind turbine such as particularly rotational speed of the rotor hub. C is a scaling factor which is initiated to C=1.

In a first loop, a value of C=0.9 may be applied, i.e. the power values P2 related to the second control rule are 10% less in comparison to the power values P1 related to the first control rule, in a subsequent second loop, a value of C=0.95 may be applied so that the change of the power values P2 based on the second control rule is only 5% less in comparison to the respective power values P1 related to the respective previous first control rule, in a subsequent third loop, a value of C=0.975 may be applied so that the change of the power values P2 based on the second control rule is only 2.5% less in comparison to the respective power values P1 related to the respective previous first control rule, etc.

Hence, in every iteration step, the scaling factor C may be varied or changed in order to optimise power output of the wind turbine. Thereby, changing the scaling factor C is iteratively always in the direction of an optimisation of the power output the wind turbine. Basically, scaling may be performed both in positive and negative direction.

Alternatively, in respective recurrent loops, a respective first control rule may refer to $P2=P1-C$ or alternatively $P2=C_1*P1-C_2$. In the latter case, $C_1$ and $C_2$ refer to different scaling factors, offsets, or the like. Hence, generally different ways of determining respective power values of a respective second control rule are feasible.

Aside, the present invention relates to a wind turbine adapted to execute the method as described before. All annotations regarding the inventive method also apply to the inventive wind turbine.

BRIEF DESCRIPTION OF THE DRAWINGS

In the following, the invention is described in detail as reference is made to the principle drawings showing exemplary embodiments of the invention, whereby.

DETAILED DESCRIPTION OF INVENTION

Figure 1:
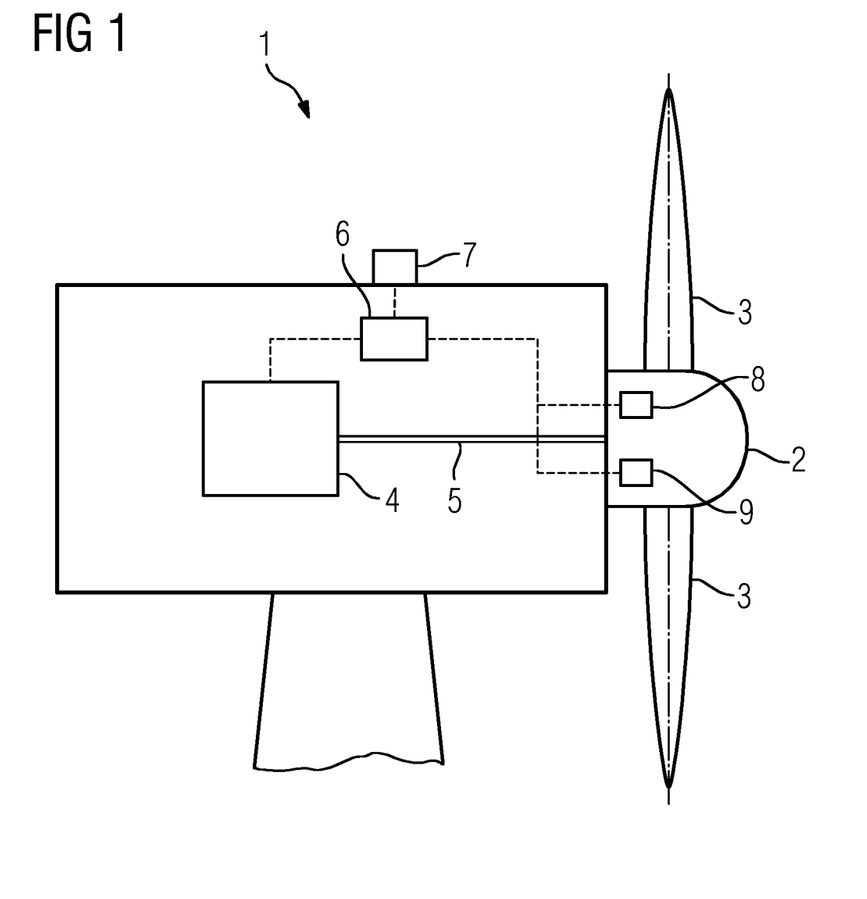
FIG. 1 shows a principle drawing of a wind turbine according to an exemplary embodiment of the invention.

FIG. 1 shows a principle drawing of a wind turbine 1 according to an exemplary embodiment of the invention. The wind turbine 1 comprises a rotor hub 2 supporting a number of rotor blades 3 with the rotor blades 3 being pitchable around their longitudinal axes by an appropriate rotor blade pitching means (not shown). The wind turbine 1 is a direct-drive wind turbine, i.e. the rotor hub 2 is directly coupled to a generator 4 by means of a main shaft 5. Yet, the provision of a gear box interposed between the rotor hub 2 and the generator 4 is not obligatory, but in principle possible.

Further, a control unit 6 in terms of a central wind turbine controller is provided which control unit 6 communicates with the generator 4 and respective sensor means provided with the wind turbine 1, i.e. a climatic sensor 7 providing climatic information regarding the climatic conditions in the region of the wind turbine 1 such as information relating to ambient temperature and/or ambient pressure and/or ambient humidity, etc., a rotational speed sensor 8 providing information regarding the rotational speed of the rotor hub 2, and a rotor blade pitch angle sensor 9 providing information regarding the pitch angle of the respective rotor blades 3. As is known, the pitch angle of a respective rotor blade 3 is defined as the angle between the blade chord line or axis of the blade chord line of the respective rotor blade 3 and the plane of rotation of the rotor hub 2.

The control unit 6 is also adapted to detect changes in the aerodynamic performance of at least one of the rotor blades 3. In such a manner, the control unit 6 is particularly adapted to detect if the surface of at least one rotor blade 3 is at least partially covered with ice. The principle of detecting ice on at least one of the rotor blades 3 may be based on the teachings as disclosed in WO 2011/127990, for instance.

Figure 2:
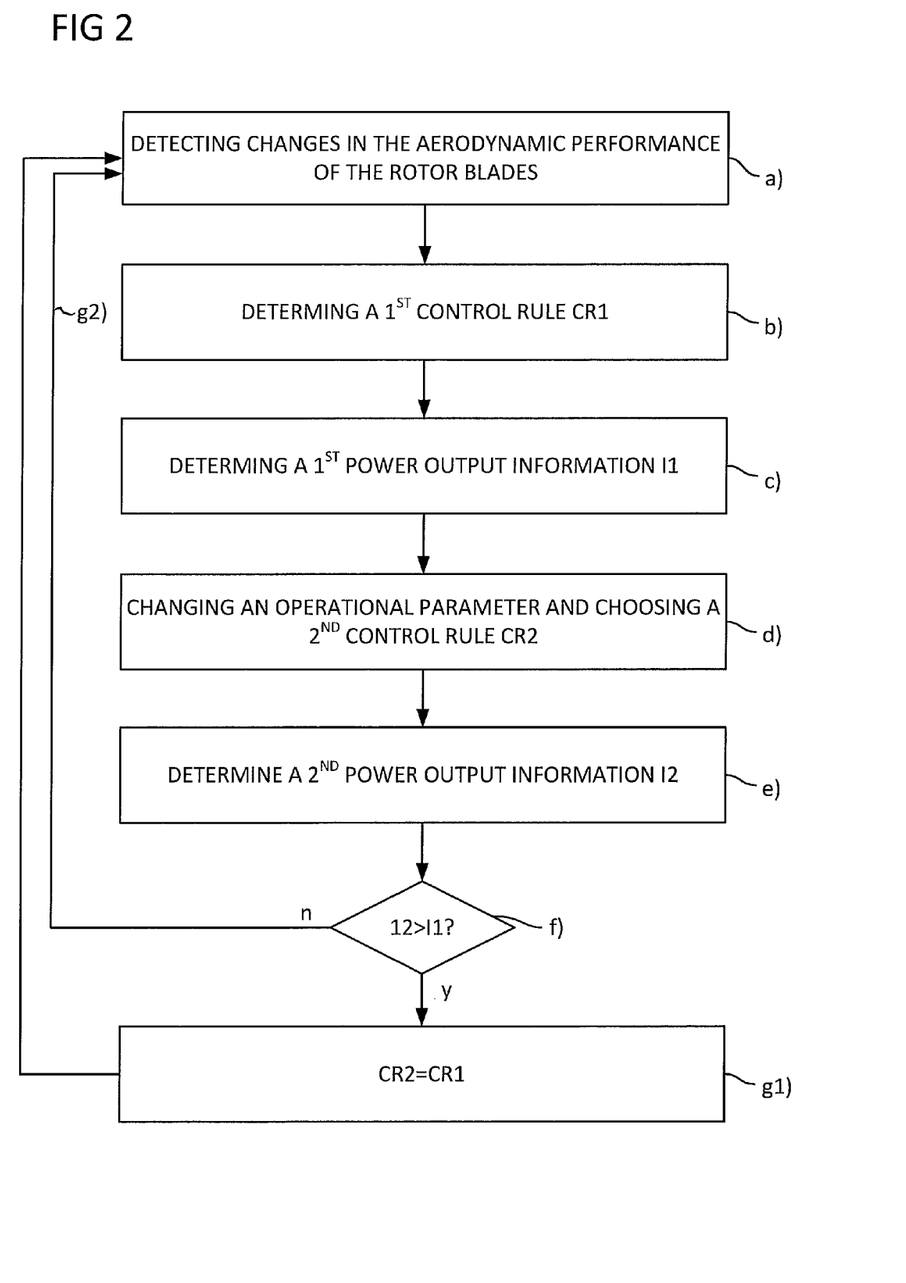
FIG. 2 shows a flow-chart of the method according to an exemplary embodiment of the invention.
Figure 3:
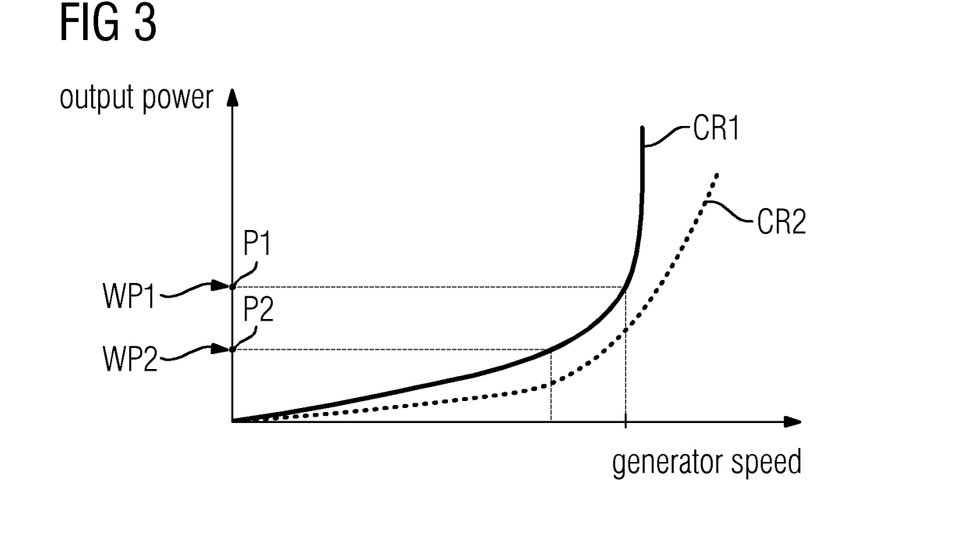
FIG. 3 shows an exemplary speed-power-curve as stored in a control unit of a wind turbine according to an exemplary embodiment of the invention.

The inventive method for operating a wind turbine 1 will be explained on basis of FIGS. 2, 3, and 4, whereby FIG. 2 shows a flow-chart of the method according to an exemplary embodiment of the invention and FIG. 3, 4 show exemplary speed-power-curves which may be stored in a control unit 6 of a wind turbine 1. Generally, FIG. 3, 4 could alternatively relate to or show respective speed-torque-curves.

The inventive method begins in step a) with the detection of changes in the aerodynamic performance of at least one of the rotor blades 3. Thereby, it is particularly detected if at least one of the rotor blades 3 is at least partially covered with ice.

If any changes in the aerodynamic performance of at least one of the rotor blades 3 are detected, such as in the exemplary case of at least one at least partially frosted rotor blade 3, the inventive method continues with step b), i.e. determining a first control rule CR1 of the wind turbine 1 which first control rule CR1 is related to power output of the wind turbine 1. Otherwise, normal operation of the wind turbine 1 is continued.

Generally, a respective control rule CR1, CR2 may embrace a number of control parameters and/or operational parameters of the wind turbine 1. Exemplary operational parameters may relate to working points of the wind turbine 1, torque on the main shaft 5 and/or the generator 4 of the wind turbine 1, rotational speed of the rotor hub 2 and/or rotating components of the generator 4 and/or load information concerning at least one component of the wind turbine 1, etc. Respective control rules CR1, CR2 particularly include at least one power value P1, P2 indicating a degree of the amount of electric power to be provided by the generator 4 to at least one electrical converter unit (not shown) of the wind turbine 1.

In the simplest case, the first control rule CR1 may be the same control rule CR as used during normal operation of the wind turbine 1, i.e. when no changes in the aerodynamic performance of at least one of the rotor blades 3 have been detected.

Figure 4:
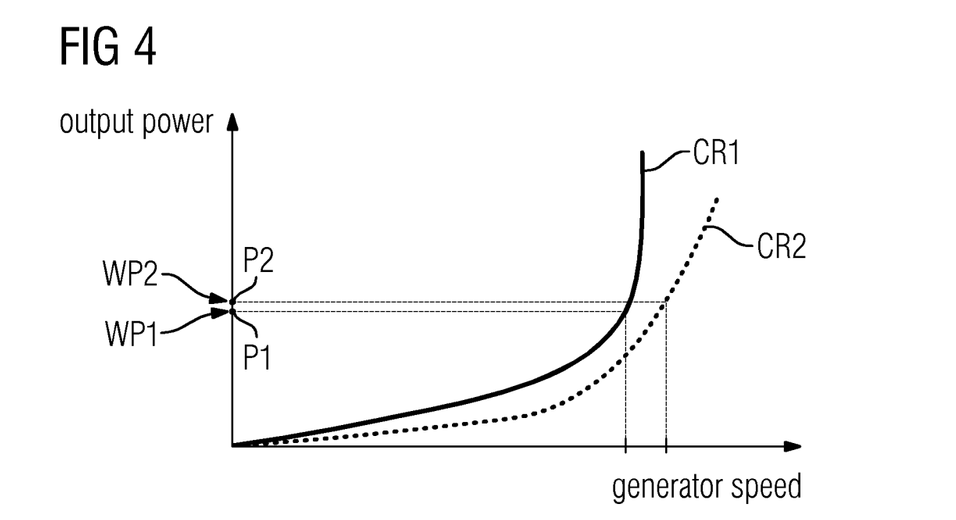
FIG. 4 shows an exemplary speed-power-curve as stored in a control unit of a wind turbine according to an exemplary embodiment of the invention.

An exemplary first working point WP1 can be seen in the speed-power-curve related to a respective first control rule CR1 shown in FIG. 3, 4 showing plots of the output power of the generator 4 (y-axis) versus the generator speed, i.e. the rotational speed of the rotating component (rotor) of the generator 4 which directly corresponds to the rotational speed of the main shaft 5 as well as to the rotational speed of the rotor hub 2 for the direct drive wind turbine 1 depicted in FIG. 1. The first working point WP1 may relate to a first power value P1 of approx. 1000 kW, for instance. I.e., the wind turbine 1 is operated in such a manner that the generator 4 will supply a power of approx. 1000 kW to the at least one respective electrical converter unit during normal conditions.

After a certain time interval, which may be denoted as settling time and may take 30 seconds, for instance, a first power output information I1 indicating a first power output P1 of the wind turbine 1 based on the first control rule CR1 including the first working point WP1 and the first power value P1 is determined in step c). In this manner, it is determined which effective power output is obtained on basis of the first control rule CR1 which of course is related to the first working point WP1, the first power value P1, as well as a number of corresponding control and/or operational parameters of the wind turbine 1.

Since, at least one rotor blade 3 is at least partially covered with ice negatively influencing the rotational speed of the rotor hub 2 the effective power output will usually be lower in comparison to the theoretically possible power output based on the first control rule CR1.

In the following step d) at least one operational parameter of the wind turbine 1 is changed and a second control rule CR2 is chosen in such a manner that the first control rule CR1 is replaced by the second control rule CR2. Particularly, a respective second control rule CR2 is chosen in such a manner that the respective power values P1 related to the first control rule CR1 are collectively changed by a certain value (or scaling factor) so that respective power values P2 are obtained (cf. FIG. 3). This is achieved by scaling, i.e. usually scaling down, the respective power values P1 related to the first control rule CR1 or working point WP1, respectively by means of a scaling factor C according to P2=C*P1, for instance.

As mentioned above, both P1 and P2 may be a function of different operational parameters of the wind turbine such as particularly rotational speed of the rotor hub and air density.

Aside, in dependence of the respective scaling factors C the second control rule CR2 may involve an at least partially or even entirely differently shaped speed-power-curve (cf. dotted line in FIG. 3, 4).

Initially, C=1 but when changing the first control rule CR1, i.e. when exemplarily changing the first working point WP1 correlated to the first control rule CR1 and hence changing the first power values P1, C may be chosen to a value of 0.9 so that the power the generator 4 supplies to the respective electrical converter units of the wind turbine 1 is reduced by 10% for a given rotational speed. The second power value P2 is applied for further operation of the wind turbine 1.

In such a manner, the torque required or demanded by the generator 4 is also reduced for a given rotational speed and hence—under the premise of a constant wind speed—the rotational speed of the rotor hub 2 and the main shaft 5 is not entirely used for operating the generator 4 so that rotation of the rotor hub 2 is eased giving rise to an increase in rotational speed of the rotor hub 2. The rise of the rotational speed of the rotor hub 2 directly counteracts the tendency of stalling due to ice at least partially covering at least one of the rotor blades 3. After a certain time, the rotor hub 2 may spin up, i.e. the rotational speed may increase leading to an increase of the power output of the wind turbine 1.

In step e), akin to step c), a second power output information I2 indicating a second power output P2 of the wind turbine 1 based on the second control rule CR2 including the second working point WP2 and respective power values P2 is determined. Again, a certain time interval may have to be passed after applying the second control rule CR2 in step d). The time interval may be 30 seconds, for instance.

Hence, the second control rule CR2 including the second working point WP2 and respective power values P2 may be chosen under the premise that an increase of the rotational speed of the rotor hub 2 is obtained or at least theoretically obtainable after a respective settling time.

In the subsequent step f) the first and second power output information I1, I2 are compared, i.e. the respective effective power outputs of the wind turbine 1 based on the first and second control rules CR1, CR2 are compared. In such a manner, it may be observed if the effective power output of the wind turbine 1 based on the second control rule CR2 has changed, i.e. particularly has exceeded the effective power output of the wind turbine 1 based on the first control rule CR1 which would be related to an optimisation of the operation of the wind turbine 1 or the efficiency of the wind turbine 1, respectively.

If the effective power output of the wind turbine 1 based on the second control rule CR2 exceeds the first power output P1 of the wind turbine 1, steps a)-f) are repeated with the currently used second control rule CR2 being used as the first control rule CR1 in step b), i.e. the current second control rule CR2 replacing the originally used first control rule CR1. Hence, the inventive method may be deemed as recurrent loop.

Thereby, it is possible that the scaling factor C may be changed in step d) of the subsequent loop, i.e. when emanating from the second control rule CR2 having become the first control rule CR1 in the second loop in step b).

In such a manner, an adaptive and iterative change of the respective first control rules CR1 and respective working points WP1 as well as power values P1 is possible, whereby in a first loop, a value of C=0.9 may be applied, i.e. the power values P2 related to the second control rule CR2 are each 10% less in comparison to the respective power values P1 related to the respective first control rule CR1, in a subsequent second loop, a value of C=0.95 may be applied so that the change of the power values P2 based on the respective second control rule CR2 is only 5% less in comparison to the power values P1 of the wind turbine 1 related to the respective first control rule CR1, in a subsequent third loop, a value of C=0.975 may be applied so that the change of the power values P2 based on the second control rule CR2 are only 2.5% less in comparison to the respective power values P1 related to the first control rule CR1, etc.

If the comparison result obtained in step f) indicates that the effective power output of the wind turbine 1 based on the application of the second control rule CR2, i.e. particularly the second power values P2 does not exceed the effective power output of the wind turbine 1 based on the first control rule CR1, steps a)-f) are repeated, whereby a different second control rule CR2, possibly also including or involving different second working points WP2 and particularly different power values CR2 is applied in step d). The different second control rule CR2 will usually relate to more significantly changed power values P2 of the wind turbine 1 so that the aforementioned effects of a reduced power demand of the generator 4 and thus an increase of the rotational speed of the rotor hub 2 will be more effective.

Another possible approach embraced by the inventive method is depicted in FIG. 4, which may be particularly applied, when the wind turbine 1 tends to stall under operation on basis of the first control rule CR1. Constant wind speed is assumed. Thereby, according to the inventive method and the aforementioned annotations (cf. step d)) the first control rule CR1 is replaced by a respective second control rule CR2 so that the wind turbine 1 will no longer be operated on basis of the first control rule CR1, but on basis of the newly applied second control rule CR2.

After a certain settling time and according to the aforementioned annotations, the output power of the wind turbine 1 will be increased, i.e. the effective power output of the wind turbine 1 on basis of the second control rule CR2 is higher in comparison to the effective power output of the wind turbine 1 on basis of the first control rule CR1.

It is possible that in the transition from WP1 to WP2 the power output may initially decrease since the slope of the speed-power-curve related to the second control rule CR2 is lower in comparison the slope of the speed-power-curve related to the first control rule CR1 (cf. FIG. 3, 4). Yet, due to an increase of the rotational speed of the rotor hub 2 the effective power output of the wind turbine 1 increases as well leading to an optimised operation of the wind turbine 1.

Generally, the frequency of determining, choosing, and applying a respective second control rule CR2, i.e. exemplarily determining, choosing, and applying a respective second working points WP2 and power values P2 correlated to the respective second control rule CR2 may be varied.

In particular, the frequency of determining, choosing, and applying a respective second control rule CR2 may be varied in dependency of at least one climatic information as obtained from the climatic sensor 7, for instance. In such a manner, the frequency of changing respective control rules CR1 of the wind turbine 1, i.e. the time between changing the respective control rule CR1 of the wind turbine 1, i.e. the time between replacing a respective first control rule CR1 by a second control rule CR2, may vary in dependency of diverse climatic parameters indicating the climatic conditions in the region of the wind turbine 1.

While specific embodiments have been described in detail, those with ordinary skill in the art will appreciate that various modifications and alternative to those details could be developed in light of the overall teachings of the disclosure. For example, elements described in association with different embodiments may be combined. Accordingly, the particular arrangements disclosed are meant to be illustrative only and should not be construed as limiting the scope of the claims or disclosure, which are to be given the full breadth of the appended claims, and any and all equivalents thereof. It should be noted that the term "comprising" does not exclude other elements or steps and the use of articles "a" or "an" does not exclude a plurality.

The invention claimed is:

1. A method for operating a wind turbine which includes a rotor hub supporting a rotor blade, the method comprising:
  a) detecting changes in the aerodynamic performance of the rotor blade of the wind turbine;
  b) determining a first control rule of the wind turbine being related to power output of the wind turbine;
  c) determining a first power output information indicating a first power output of the wind turbine based on the first control rule;
  d) changing at least one operational parameter of the wind turbine and choosing at least one second control rule in such a manner that the first control rule is replaced by the second control rule being related to power output of the wind turbine;
  e) determining a second power output information indicating a second power output of the wind turbine based on the second control rule;
  f) comparing the first and second power output information;
  g1) when the second power output of the wind turbine exceeds the first power output of the wind turbine, repeating a)-f) with the second control rule being used as the first control rule in b);
  g2) otherwise repeating a)-f), whereby a different second control rule is applied in d).

2. The method according to claim 1,
wherein choosing of the second control rule is executed in such a manner that the rotational speed of the rotor hub based on the second control rule is higher in comparison to the rotational speed of the rotor hub based on the first control rule.

3. The method according to claim 1,
wherein choosing of the second control rule is executed in such a manner that power values indicating a degree of the amount of power as provided by the generator to at least one electrical converter unit of the wind turbine based on the second control rule are higher or lower in comparison to respective power values based on the first control rule.

4. The method according to claim 1,
wherein a predetermined time is waited after step d) before the second power output information is determined in step e).

5. The method according to claim 1,
wherein the frequency of determining and choosing a respective second control rule is dependent from a climatic parameter indicating the climatic conditions in the region of the wind turbine.

6. The method according to claim 5,
wherein the climatic parameter includes at least one parameter selected from the group consisting of ambient temperature, ambient pressure, and ambient humidity.

7. The method according to claim 1,
wherein the control parameters allocated to a respective control rule embrace a plurality of operational parameters of the wind turbine.

8. The method according to claim 7,
wherein the operational parameters relate to torque on a main shaft and/or a generator of the wind turbine, rotational speed of the rotor hub and/or rotating components of a generator of the wind turbine and/or load information concerning at least one component of the wind turbine.

9. The method according to claim 1,
wherein choosing of the second control rule is executed by using an adaptive step-size.

10. The method according to claim 1
wherein detecting of the aerodynamic properties of the rotor blade of the wind turbine comprises detecting if ice is at least partially covering the surface of the rotor blade.

11. A wind turbine comprising a control unit adapted to execute the method according to claim 1.

* * * * *